United States Patent [19]

Colanzi

[11] Patent Number: 4,795,277
[45] Date of Patent: Jan. 3, 1989

[54] SUPPORT ELEMENT OF IMPROVED TYPE FOR A VEHICLE WHEEL

[75] Inventor: Franco Colanzi, Turin, Italy
[73] Assignee: Riv-Skf Officine di Villar Perosa S.p.A., Turin, Italy
[21] Appl. No.: 102,420
[22] Filed: Sep. 29, 1987
[30] Foreign Application Priority Data
  Oct. 3, 1986 [IT] Italy .............................. 53907/86[U]
[51] Int. Cl.$^4$ ........................................... F16C 19/16
[52] U.S. Cl. .................................... 384/447; 384/585
[58] Field of Search ............... 384/447, 585, 571, 586, 384/584, 569, 571, 565

[56] References Cited

U.S. PATENT DOCUMENTS

| | | | |
|---|---|---|---|
| 2,628,137 | 2/1953 | Ashton | 384/447 |
| 2,708,767 | 5/1955 | Dean | 384/447 |
| 3,275,391 | 9/1966 | Blais | 384/447 |
| 4,333,695 | 6/1982 | Evans | 384/571 |

Primary Examiner—Lenard A. Footland
Attorney, Agent, or Firm—Klauber & Jackson

[57] ABSTRACT

There is described a support element for a vehicle wheel, particularly adapted to be used in a suspension for connection of the wheel to the strut thereof; the support element is substantially constituted by a bearing the respective inner and outer rings of which are both provided with respective facing radially outer flanges by means of which they are connectable on one side to the wheel and on the opposite side to the suspension strut, and the rolling bodies of which are constituted by conical rollers disposed adjacent one another to form a single ring with their axes alternately disposed at 90° to one another.

5 Claims, 1 Drawing Sheet

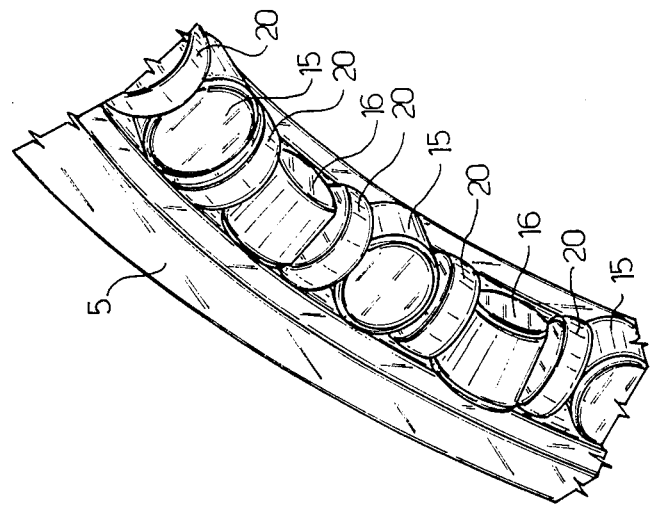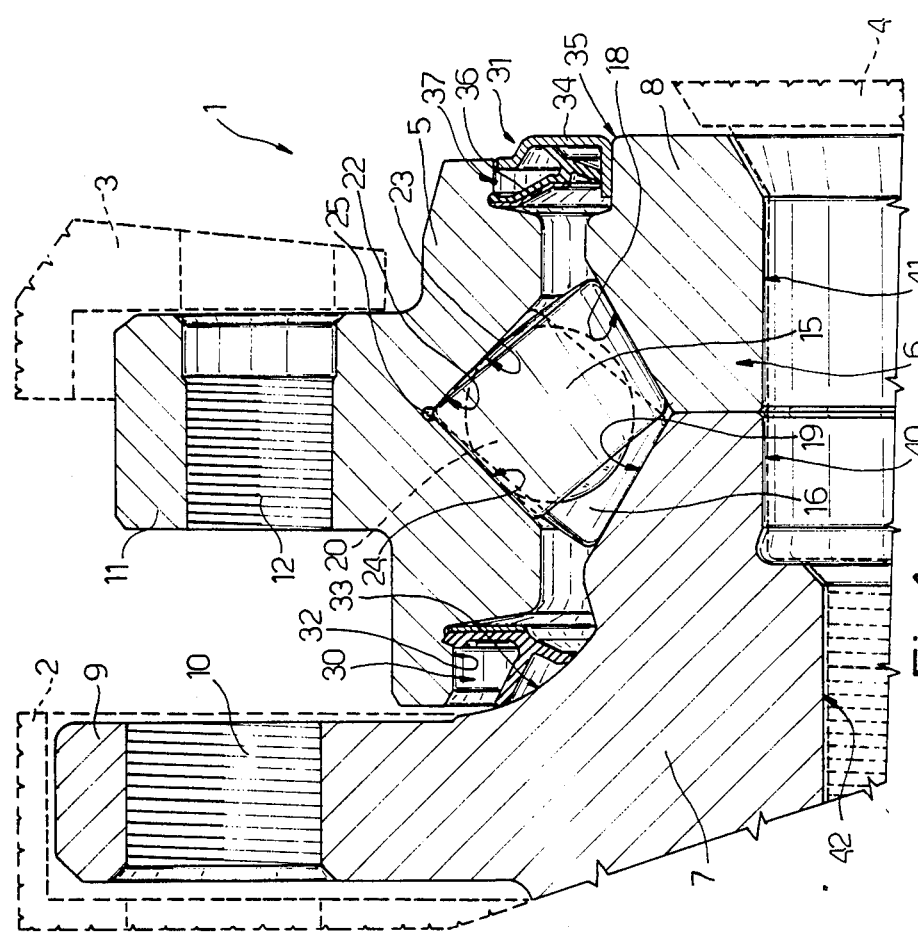

SUPPORT ELEMENT OF IMPROVED TYPE FOR A VEHICLE WHEEL

BACKGROUND OF THE INVENTION

The present invention relates to a support element of improved type for a vehicle wheel, and in particular to an element or support unit adapted to form part of the vehicle suspension and able to connect the wheel in a rotatable manner to the suspension strut itself and, possibly, to the constant velocity joint if it is a driven wheel.

It is known that the connection of the wheels of a vehicle to the elements of the suspension thereof is currently effected by means of a plurality of members of complex form, high weight and high cost, comprising at least a hub, a stub axle and a rolling element bearing so that the connection unit as a whole has large dimensions, is constructionally very complex and is very expensive and heavy; in more improved vehicles there have been introduced bearings having a double ring of balls and provided with flanges which perform both the functions of the hub and the stub axle thus permitting much simplification and allowing the attachment parts between the wheel and the suspension to be lightened; however, even such bearings have a relatively large axial dimension and, in the presence of small radial spaces, have low efficiency due to the necessity of employing rolling element bearings of small diameter which are therefore able to support only relatively low loads.

SUMMARY OF THE INVENTION

The object of the invention is that of providing an element or support unit for a vehicle wheel, of reduced dimensions and reduced weight and which, at the same time, will also be able to support high loads.

The said object is achieved by the invention which relates to a support element for a vehicle wheel, comprising a radially outer cylindrical ring, a radially inner cylindrical ring coaxial with the outer ring, and a plurality of rolling bodies disposed between the said inner and outer rings in such a way as to make them relatively rotatable, characterised by the fact that the inner ring and the outer ring are each provided with a respective radially outer fixed flange provided with attachment holes and, in combination, the said rolling bodies are constituted by associated conical rollers disposed adjacent one another in the form of a single ring with their axes alternately disposed at 90° to one another.

BRIEF DESCRIPTION OF THE DRAWINGS

For a better understanding of the invention a non-limitative embodiment is now described and illustrated in the attached drawings, in which:

FIG. 1 is a side view partly in longitudinal section, of a support element formed according to the invention; and FIG. 2 is a perspective view on a reduced scale of a constructional detail of the support element of FIG. 1.

DETAILED DESCRIPTION OF THE INVENTION

Making reference to the Figures of the attached drawings, there is generally indicated a support element or unit 1 for a wheel 2 of a vehicle of any known type, not illustrated for simplicity; the wheel 2 can be of any known type and is illustrated schematically and only in part and, thanks to the unit or element 1, is fixed in a rotatable manner to a strut 3, also illustrated only schematically and in broken outline and only in part, of a known vehicle suspension, not illustrated for simplicity; if the wheel 2 is a driving wheel, the element or unit 1 is shaped, as will be described hereinbelow, in such a way as to be connectable also to a constant velocity unit 4 of known type, indicated only schematically in broken outline, of the said vehicle.

The support unit or element 1 is substantially constituted by a single rolling element bearing of suitable dimensions, comprising a radially outer cylindrical ring 5, a radially inner cylindrical ring 6, coaxial with the outer ring 5, and a plurality of rolling bodies disposed between the rings 5 and 6 in such a way as to render them relatively rotatable with low friction; according to the invention the inner ring 6 is composed of a pair of adjacent annular elements 7 and 8 coaxial with one another, and in the example the element 7 is formed integrally in one piece with a radially outer flange 9 shaped in such a way as to be able to support the wheel 2 and provided with a ring of attachment holes 10, preferably threaded, of which only one is illustrated for simplicity; in combination with this characteristic the outer ring 5 is also provided with a radially outer flange 11 formed, integrally in one piece therewith, disposed facing and coaxial with the flange 9 and also provided with a ring comprising a plurality of attachment holes 12, preferably threaded, by means of which it is fixable to the strut 3; in further combination with the said characteristics the rolling elements inserted between the ring 5 and the ring 6, rather than being constituted by balls or rollers disposed in two rings to support, as is known, loads of mixed type, namely radial and axial loads which occur in the use illustrated, they are constituted by respective conical rollers 15 and 16 disposed obliquely and adjacent one another in the form of a single ring of rolling bodies but with their axes alternately disposed turned through 90° from one another; all the rollers 15 are therefore disposed inclined with the minor base facing towards the element 7 and therefore roll on the element 8, whilst all the rollers 16 are disposed exactly oppositely, that is to say inclined with the minor base facing towards the element 8 and rolling on the element 7. These are in fact both provided with respective conical tracks 18 and 19 facing one another and at opposite inclinations, on which the alternate rollers 15 and 16 roll respectively; between the rollers 15 and 16 having alternate axes turned through 90°, there are inserted plastics discs 20 of cylindrical form the axis of symmetry of each of which is disposed transversely of that of the conical rollers 15 and 16, in such a way as to be disposed substantially along the generatrices of a toroidal solid having an axis coincident with that of the rings 5 and 6. Where the rolling bodies 15 and 16 lodge the outer ring 5 is provided internally with an annular groove 22 which is substantially V-shape in section, the opposite flanks of which are defined by respective annular track surfaces 23 and 24 facing one another and alternately engaged by conical rollers 15 and 16 respectively; along the line of intersection between the surfaces 23 and 24 is an annular groove 25 formed in such a way as to avoid the initiation of fracture processes due to the stresses in use; preferably, the flange 11 is integrally formed with the ring 5 in correspondence with the annular groove 22, in such a way as to serve also as reinforcement for the ring 5.

Finally, the unit or element 1 is completed by a pair of sealing assemblies 30 and 31 which may be of any known type, of which the assembly 30 is carried by a seat 32 formed internally of the ring 5 on the side of the flange 9 and substantially opposite the root region of this and cooperates with a curved surface 34 joining the root region of the flange 9 to the remainder of the element 7, whilst the assembly 31 is of the two-element type constituted by a screen 34 fixed on a cylindrical rebate 35 of the element 8 and by a double lip seal element 36 housed in a seat 37 formed on the outer ring 5 on the side opposite the seat 32. Finally, if the supported wheel 2 is a driving wheel, the annular elements 7 and 8 are shaped in such a way as to be connectable to the constant velocity joint 4 and therefore have respective central seats 40 and 41 of which the seat 40 is formed on the element 7 and preferably provided with a splined coupling, not illustrated for simplicity and because it is known, and with a hole 42 again formed on the element 7 and able to allow the fixing, in a known way, by means of a nut not illustrated, of the inner ring 6 to the joint 4.

From what has been described the advantages associated with the particular embodiment, constituted by the support unit or element of the invention are evident; in particular, the coupling on the same bearing of the two flanges and conical rollers disposed in a single ring, but alternately disposed with their axes turned through 90° from one another, permits a support element or unit for a vehicle wheel of high constructional simplicity and extremely compact form to be obtained with great lightness and both reduced axial and radial dimensions, and at the same time capable of supporting mixed loads, particularly radial and axial loads. The increase in usefulness which derives from the support element or unit according to the invention with respect to similar known elements or units is therefore evident. Finally, it is clear that modifications and variations to what has been described can be introduced without by this departing from the ambit of the present invention.

For example, the discs 20, which in substance in the described example serve as a cage, can be replaced in variant not illustrated for simplicity by a true and proper spacer cage of one piece type or of a fabricated type made from several pieces, preferably made of plastics material.

I claim:

1. A support element (1) for a vehicle wheel, comprising a radially outer cylindrical ring (5), a radially inner cylindrical ring (6) coaxial with the outer ring (5) and a plurality of rolling bodies disposed between the said inner and outer rings (5, 6) in such a way as to make them relatively rotatable, characterised by the fact that the inner ring (5) and the outer ring (6) are each provided with a respective radially outer fixed flange (9, 11) provided with attachment holes (10, 12) and, in combination, the said rolling bodies are constituted by respective..conical rollers (15, 66) disposed adjacent one another in the form of a single ring with their axes alternately disposed at 90° to one another.

2. A support element according to claim 1, characterised by the fact that the said inner ring (6) is composed of a pair of coaxial adjacent annular elements (7, 8) one of which (7) is integrally provided in one piece with the said fixed flange (9) of the inner ring (6) and both provided with respective facing conical tracks (18, 19) having opposite inclinations on which alternate said conical rollers (15, 16) roll, the said annular elements (7, 8) being shaped in such a way as to be connectable to a constant velocity joint (4) of a vehicle suspension.

3. A support element according to claim 1, characterised by the fact that the said outer ring (5) is provided internally with an annular groove (22) of V-shape cross-section, the opposite flanks of which are defined by respective track surfaces (23, 24) alternatively engaged by the said conical rollers (15, 16).

4. A support element according to claim 3, characterised by the fact that the said flange (11) fixed to the outer ring (5) is integrally formed in one piece therewith in correspondence with the said groove (22).

5. A support element according to claim 1, characterised by the fact that between the said conical rollers (15, 16) disposed with their axes alternately turned through 90° are inserted plastics discs (20) having an axis of symmetry transverse that of the conical rollers (15, 16).

* * * * *